Dec. 9, 1941.  F. E. LAIG  2,265,943
SEAM WELD
Filed Dec. 29, 1938
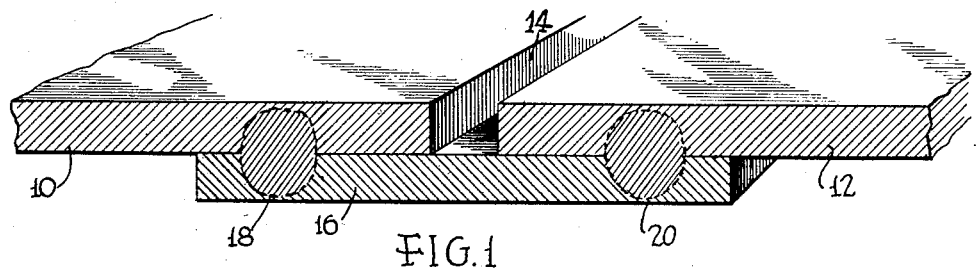
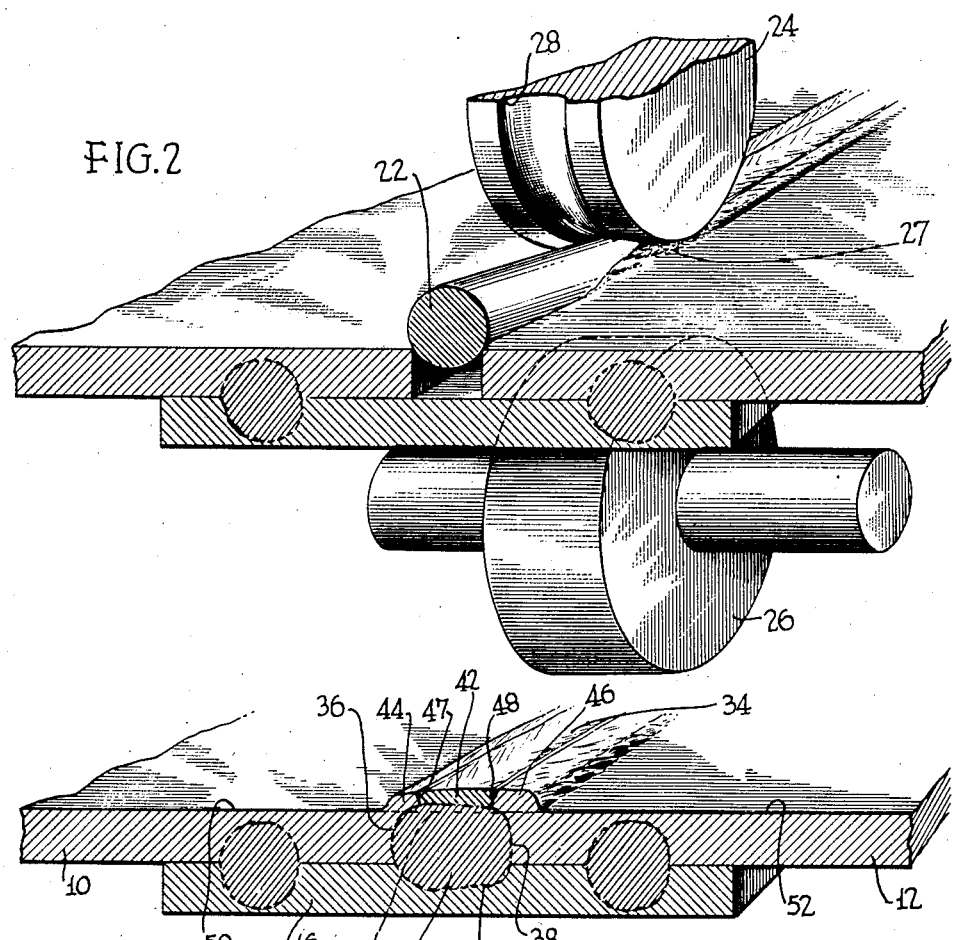
INVENTOR.
Fred. E. Laig
BY
ATTORNEY.

Patented Dec. 9, 1941

2,265,943

UNITED STATES PATENT OFFICE 2,265,943

SEAM WELD

Frederic E. Laig, Philadelphia, Pa., assignor to Edward G. Budd Manufacturing Company, Philadelphia, Pa., a corporation of Pennsylvania Application December 29, 1938, Serial No. 248,184

1 Claim. (Cl. 219—10)

This invention relates to seam welding, and more particularly to a seam weld adapted to plates in abutting relation and in which the final seam may be finished smooth and result in what is known as a sanitary seam.

In the making of tanks and containers, more particularly for food stuffs such as milk tanks, etc., it is important that the metals from which such tanks are formed are joined together in some manner so as to afford a smooth joint, free from cracks and crevices which might harbor foods which would, in time, become contaminated because of the difficulty of cleaning and removing. The present invention relates to a manner of making a seam weld as well as the seam weld itself, which weld will have full strength and a smooth, sanitary, finished surface free from cracks.

The invention is especially applicable to tanks made of stainless steel, but of course, it will be understood may be applied to other metals as well.

It is an object of the invention to provide an electric seam weld between adjacent abutting plates which is cheap to manufacture and which may have a finished smooth surface free from cracks or crevices.

Another object of the invention is to effect a seam weld between adjacent strips by first securing the strips in slightly spaced abutting relation and thereafter pressing by roller welding a wire into the space between the abutting plates.

A further object of the invention is to provide a seam weld which, when completed, will produce a bulge, and which bulge, when removed, may result in a smooth surface free of all cracks.

A still further object of the invention is to produce a seam weld between slightly spaced abutting plates by passing a current transversely thereof through a filter strip and the plates, and fusing the filler strip with the plates.

The above and other novel features of the invention will appear more fully hereinafter from the following detailed description when taken in conjunction with the accompanying drawing. It is expressly understood, however, that the drawing is employed for purposes of illustration only and is not designed as a definition of the limits of the invention, reference being had for this purpose to the appended claim.

In the drawing wherein similar reference characters refer to similar parts throughout the several views:

Figure 1 is a perspective view of a pair of plates positioned and secured for seam welding.

Figure 2 is a view similar to Figure 1 illustrating the manner of roller welding a filler strip to the plates to form the seam weld.

Figure 3 is a similar view showing the completed weld but prior to finishing.

Referring to the drawing, there will be seen in Fig. 1 a pair of aligned plates 10 and 12 between which an abutting joint or the equivalent is to be formed. The two plates are arranged with a spacing, indicated at 14, between the edges, which is substantially uniform throughout the length of the joint to be formed, and the plates 10 and 12 are held in such position by a butt strap 16 which may be conveniently spot welded or otherwise secured to the plates 10 and 12.

The space 14, provided between the plates 10 and 12 which latter are held in fixed spaced relation by the butt strap 16, is filled during a roller welding operation by a filler strip such as is indicated in Fig. 2 at 22. The filler strip is preferably of the same material as the plates 10 and 12, and the butt strap 16, but has a greater cross section than the cross section of the space between the plates 10 and 12 indicated at 14. By the use of welding rollers 24 and 26 the filler strip 22 is pressed into the space 14 as is shown at 27 the same being effected by passing a current between the welding rolls 24 and 26. The welding roll 24 which directly engages the filler strip 22 is best provided with a guiding groove 28 which assists in guiding the filler strip into the space 14 between the plates 10 and 12.

The welding current passing between the rolls 24 and 26 will be sufficient to produce a welding nugget 30, for example, of the section shown in Fig. 3. While the metal is in a fused condition it will become fused to the adjoining plates 10 and 12 as well as the butt strap 16 and provide an excess metal on the top surface in the region of the seam. As the welding rollers progress along the seam, the softened metal will be compressed together between the rollers and to some extent will tend to pile up behind the roller 24, but nevertheless fusing a continuous nugget 30 which will completely fill the space 14 originally extending between the plates 10 and 12.

As has been heretofore mentioned, the filler strip 22 has preferably a considerably greater cross section than the space 14 into which it is to be roller seam welded, with the result that with the softening of the metal due to the passage of the welding current, the same will produce a bulging seam 34 as shown in Figure 3. The bulging seam is composed of the continuous nugget 30 extending the length of the seam, and which is fused at 36 and 38 to the adjoining plates 10 and 12, and at 40 to the butt strap 16. The portion of the metal indicated at 42 constitutes the excess filler strip which did not become fused because of the chilling effect of the roller 24. The tongue-like portions of the metal indicated at 44 and 46 are portions of the plates 10 and 12 respectively which have been bulged out by reason of the pressure exerted during the effecting of the weld. These tongue-like portions are also fused to the weld nugget but are not fused to the adjacent unfused portion 42 of the filler strip, and thus would produce longitudinal cracks 47 and 48 extending the length of the seam. These cracks are extremely minute, scarcely discernible to the naked eye, and in many cases, would not be objectionable in a tank or other storage receptacle, but it is preferable that there be no such cracks, and more particularly in containers where food stuffs are stored. By so choosing the filler strip 22 so as to produce a bulge of the order shown in Fig. 3, it is possible, upon completion of the seam weld, to grind or cut or remove by any suitable means the bulged metal to provide a smooth surface 48 across the seam which preferably extends into and forms a part of the plane surfaces 50 and 52 of the plates 10 and 12. It will appear from observation of Fig. 3, that by so cutting away the bulged metal, the complete removal of the unfused cracks 47 and 48 is effected, and the resulting smooth surface is composed entirely of metals fused together so that there is continuous metal from the plate 10 to the plate 12 which is integral and free from cracks or crevices. It will, of course, appear to any one skilled in the art, in view of the foregoing, that should the weld nugget 30 be of less dimension and not extend above the surface line indicated at 48, that in finishing the seam, the metal might be removed to produce a concavity which would, at the same time, remove the unfused cracks between the adjoining parts.

In producing a seam weld it has been made clear that the welding current is passed through the filler strip, the abutting edges and the butt strap so that the current travels transversely with respect to the plates 10 and 12. In effecting the weld, it is preferable that the current be applied intermittently, for example, if 60 cycle alternating current is employed, the welding current may be on for four cycles and off for four cycles, and that the rollers may proceed progressively or by increments, either as may be found most suitable. By so applying the current, better cooling is maintained. Also the current is so concentrated and the interval is so brief for each of the successive welds that in working with stainless steel, carbide precipitation is inhibited and the corrosion resistance of the metal retained. Thus, such a seam weld is of considerable use in connection with fabricating chemical tanks. It will appear obvious to persons skilled in the art that such a seam weld may be applied to the elemental seams of tanks as well as circumferential seams as may be found advantageous, or in fact, any seam which might be desired where the adjoined plates are in abutting relation or in substantially abutting relation.

There has thus been described a novel method of producing a seam weld as well as a novel seam in itself. While the butt strap has been employed for the purpose of holding adjoining plates in their proper relation, it should appear that any suitable means might be employed for holding the abutting plates in place and therewith passing a welding current simultaneously through the abutting plates and the filler strip. It may in practice be desirable to provide a smooth seam weld having smooth surfaces on both sides. In such a case, the butt strap may subsequently be cut away and a portion of the nugget 30 to provide such a smooth surface.

Though a single practical embodiment and several modifications of the invention have been illustrated and described, it is to be understood that the invention is not limited thereto, but may be practiced for various equivalent ways to produce various mechanical forms. As various changes in procedure and final seam construction may be made without departing from the spirit of the invention as will be apparent to those skilled in the art, reference will be had to the appended claim for a definition of the limits of the invention.

What is claimed is:

The method of uniting by resistance seam welding the edges of a pair of metal members of the same thickness which consists in disposing the edges of said members in alignment in uniformly spaced relation on a butt strap and spot welding the same to a butt strap to close one side of the space, disposing a metal wire of a cross-sectional area greater than the cross-sectional area of the space between said edges in such space, and then, while passing a welding current through the wire, the metal of the spaced edges and the butt strap in a direction transversely thereof, pressing the wire into said space to simultaneously upset the metal of said edges to a thickness greater than the original thickness thereof and produce a longitudinal weld nugget including portions of said edges and a portion of said butt strap and extending beyond the surface plane of the metal members, and thereafter removing the surface metal of the resulting seam to a depth sufficient to include a portion of the nugget and portions of the upset portions of said edges whereby to remove cracks between the unfused surface metal of said wire and edges.

FREDERIC E. LAIG.